(12) United States Patent
Sun et al.

(10) Patent No.: US 6,243,494 B1
(45) Date of Patent: Jun. 5, 2001

(54) TEMPLATE MATCHING IN 3 DIMENSIONS USING CORRELATIVE AUTO-PREDICTIVE SEARCH

(75) Inventors: Shijun Sun; Yongmin Kim, both of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/216,691

(22) Filed: Dec. 18, 1998

(51) Int. Cl.$^7$ .................................. G06K 9/62; G06K 9/64
(52) U.S. Cl. ......................... 382/216; 382/217; 382/278
(58) Field of Search .................................. 382/209, 210, 382/212, 213, 215, 216, 217, 218, 219, 220, 130, 131, 278; 348/699

(56) References Cited

U.S. PATENT DOCUMENTS

| | | | |
|---|---|---|---|
| 5,690,106 | * 11/1997 | Bani-hashemi et al. | 600/425 |
| 5,790,702 | * 8/1998 | Yoshimura | 382/209 |
| 5,943,442 | * 8/1999 | Tanaka et al. | 382/216 |
| 5,970,499 | * 10/1999 | Smith et al. | 707/104 |
| 6,009,212 | * 12/1999 | Miller et al. | 382/294 |
| 6,014,181 | * 1/2000 | Sun | 348/699 |
| 6,031,568 | * 2/2000 | Wakitani | 348/169 |
| 6,075,557 | * 6/2000 | Holliman et al. | 348/51 |

FOREIGN PATENT DOCUMENTS 0806733   11/1997 (EP) .............................. G06F/17/30

OTHER PUBLICATIONS

Goshtasby, et al., "A Two–Stage Correlation Approach to Template Matching," IEEE Trans. on Pattern Analysis and Machine Intelligence, vol. PAMI–6, No. 3, May 1984, pp. 374–378.

Rosenfeld et al., "Coarse–Fine Template Matching," IEEE Trans. on Systems, Man, and Cybernetics; Feb. 1977, pp. 104–107.

Hirooka et al., "Hierarchical Distributed Template Matching," SPIE vol. 3029 0277–786X/97, pp. 176–183.

Pratt, William K.; "Correlation Technique of Image Registration," IEEE Trans. on Aerospace and Electronic Systems; vol. AES–10, No. 3; May 1974, pp. 353–358.

Musmann et al.; "Advances in Picture Coding," Proceedings of the IEEE vol. 73, No. 4; Apr. 1985, pp. 523–548.

* cited by examiner

Primary Examiner—Amelia M. Au
Assistant Examiner—Mehrdad Dastouri
(74) Attorney, Agent, or Firm—Steven P. Koda

(57) ABSTRACT

A template is analyzed to determine step sizes for searching within a search area. The template is analyzed by first padding the template with data points to increase its size. Cross-correlation between the padded template and the original template leads to identification of an effective step size along multiple axes. Step sizes for each of a horizontal, vertical and a third axis are derived. Third axis step sizes may correspond to rotation, scaling factor, subsampling factor, linear distance, time or frequency. Windows of the search area, selected based on the step sizes, then are tested in a fast search by correlating the template to selected windows to derive correlation coefficients. Any tested window which has a correlation coefficient exceeding a given value is a potential match for the template and is subject to a refined stage of comparison.

40 Claims, 6 Drawing Sheets

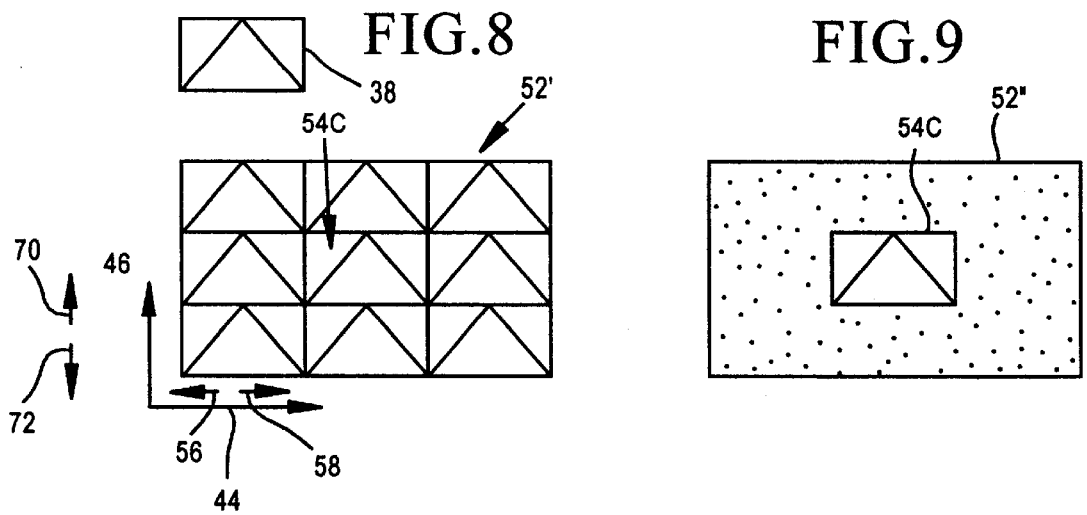
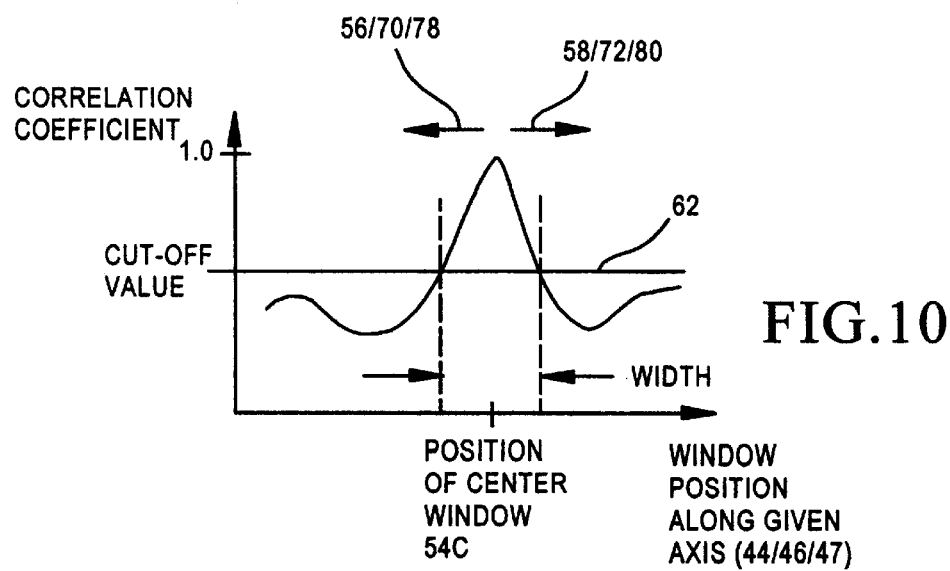
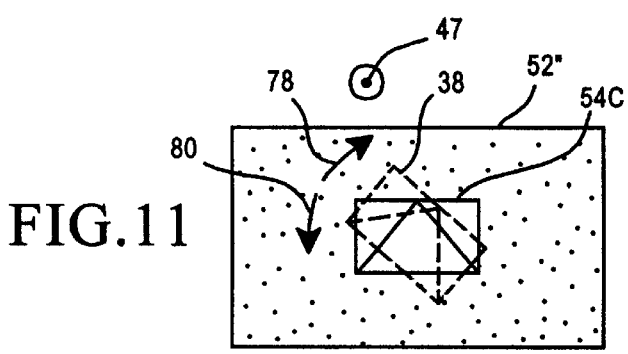

TEMPLATE MATCHING IN 3 DIMENSIONS USING CORRELATIVE AUTO-PREDICTIVE SEARCH

CROSS REFERENCE TO RELATED APPLICATIONS

This invention is related to U.S. patent application Ser. No. 09/216,692 filed on the same day for "Template Matching In 3 Dimensions Using Correlative Auto-Predictive Search". The content of that application is incorporated herein by reference and made a part hereof.

BACKGROUND OF THE INVENTION

This invention relates to template matching within a data domain, and more particularly to a method for locating a given data template within a data domain.

Template matching in the context of an image search is a process of locating the position of a subimage within an image of the same, or more typically, a larger size. The subimage is referred to as the template and the larger image is referred to as the search area. The template matching process involves shifting the template over the search area and computing a similarity between the template and the window of the search area over which the template lies. Another step involves determining a single or a set of matched positions in which there is a good similarity measure between the template and the search area window.

A common technique for measuring similarity in template matching and image registration is cross-correlation. A correlation measure is determined between the template and respective windows of the search area to find the template position which has maximum correlation. For a two-dimensional search area the correlation function generally is computed for all translations of the template within the search area. A statistical correlation measure is a common approach in which window areas are spatially convolved with the template using spatial filter functions. Because this approach is extremely expensive in terms of computation time, a more common computer implementation is to use a sum of absolute differences.

Rosenfeld et al., in "Coarse-Fine Template Matching," IEEE Transactions on Systems, Man and Cybernetics (February 1977, pp. 104–107) describe an approach where a 'reduced-resolution' template is used during a first, coarse evaluation stage. The template is divided into blocks of equal size (e.g., 'm' pixels per block). The average of each block is computed. For each pixel of the search area an average also is calculated over a neighborhood of the same size as the reduced-resolution template (e.g., m pixels). The average absolute difference between each template block average and the picture neighborhood average then is computed for each pixel of the search area. If the average absolute difference for any pixel of the search area is below a select value, then a possible match has been identified. Next, the full resolution template is compared to a window of the search area about each pixel point where the average absolute difference in the prior coarse evaluation step was below the threshold value. This fine evaluation step identifies if there actually is a good correlation.

Goshtasby et al. in "A Two-Stage Correlation Approach to Template Matching," IEEE Transaction on Pattern Analysis and Machine Intelligence, (Vol. PAMI-6, No. 3, May 1984), note the need for an accurate threshold value for the first stage evaluation. They describe a method for deriving the threshold value based upon subtemplate size and false dismissal probability.

The coarse-fine or two stage method subsample the template to match with the image. The task of subsampling the template is not a trivial task and contributes significant processing cost. In addition, the false alarms result in wasted, or an ineffective use of, processing time. Accordingly, there is a need for a more efficient method of template matching.

In the area of motion estimation for digital video and multimedia communications a three stage correlation strategy is used. In a first step, a search step size of 4 is used. Once a maximum point is found, the step size is reduced to 2 to evaluate the neighborhood of the previously determined point to choose the next search point. The third step is to search all neighboring points to find the best match. This approach speeds up the search process, but also has a high probability of mismatches or suboptimal matches. It also has difficulty handling cases in which multiple match points occur. Thus, there is a need for a more reliable, fast search method for correlating a template to windows of a search area. Further, there is a need for performing a search among 3 data dimensions using either a two dimensional.

SUMMARY OF THE INVENTION

According to the invention, a 3-dimensional correlation auto-predictive search (3-D CAPS) method is used to compare a 2-dimensional template to various 2-dimensional windows of a search area. The location(s) where the template has the highest correlation coefficient with an underlying window is selected as a match for the template. The principle of 3-D CAPS as conceived by the inventors is (1) to extract statistical information from the template itself to determine search step sizes, and (2) to perform fast searching based on this extracted information. Searching is performed by correlating the template to various windows of a search area. The windows are selected along 3 dimensions. For a 2 dimensional search area two of the dimensions for selecting windows are the two dimensions of the search area. A third dimension corresponds to searches among manipulations of the search area and template or additional slices of the search area. In one embodiment the template is rotated relative to the search area. In such embodiment the third dimension is rotation. In another embodiment the template is scaled (e.g., zooming in or out) relative to the search area. In such embodiment the third dimension is scaling factor. In another embodiment the template and the search area are subsampled to vary the resolution of each. In such embodiment the third dimension is subsampling factor (i.e., resolution). Each of such examples correspond to manipulations of the search area relative to the template. these manipulations may result in additional slices of the search area, in which the search area content is manipulated (e.g., rotated, scaled or subsampled). In other embodiments the third dimension is time, frequency or space. For example, subsequent frames of the subject matter of the search area may be captured over time. In another example, additional samplings of the subject matter of the search area are captured for differing frequencies. In yet another example the subject matter is captured in three spatial dimensions resulting in a three dimensional search area.

According to one aspect of the invention, during a first analytical step, autocorrelation is performed on the template to generate desired statistics. To use autocorrelation, the original template is padded with additional pixels to increase the template size. Cross-correlation then is performed between the padded template and the original template. The autocorrelation is highest at the center of the padded template as this area is formed by the original template. This corresponds to a peak in a graph of the autocorrelation of the padded template to original template. The width of the peak, either along a horizontal direction of the padded template, or along a vertical direction of the padded template, may be measured. The height of the maximum peak is 1.0. The horizontal width is taken as the distance along the horizontal axis between autocorrelation values of, for example, 0.5 to each side of the maximum peak. Similarly, the vertical width is taken as the distance along the vertical axis between autocorrelation values of 0.5 to each side of the maximum peak. Such value, 0.5, is referred to herein as the cut value. The cut value is exemplary and may differ for various embodiments.

The correlation between the padded template and the original template is derived about the center of the padded template along both horizontal and vertical axes. As the correlations are derived during this stepping along the axes, there comes a point where the correlation decreases to the cut value. Along the horizontal axis, there is a cut value reached to either direction of center. The horizontal distance between these two locations where the correlation has decreased to the cut value is the horizontal width. Further correlations along such axis need not be derived. Along the vertical axis, there also is a cut value reached to either direction of center. The vertical distance between these two locations where the correlation has decreased to the cut value is the vertical width. Further correlations along such vertical axis need not be derived.

These horizontal and vertical cut values are used for moving along the two linear dimensions of the search area to select windows to be tested. According to another aspect of the invention, a third dimensional analysis also is performed. For the third dimensional analysis a 2-dimensional search area (such as a 2-dimensional image) is analyzed for variation in rotation, scaling or resolution. In a sense the 2-dimensional search area becomes a three dimensional search area in which the search area slices along the third axis correspond to one of: (1) rotated copies of the original search area, (2) scaled size copies of the original search area, or (3) altered resolution copies of the original search area. In still another embodiment, the search area is a 3-dimensional search area (e.g., a 3-dimensional image). For any of these third dimensional analyses a third CAPS step size is derived, (e.g., rotational step size, scaling step size, resolution step size or z-axis step size).

According to another aspect of this invention, once step sizes are derived a fast search is performed between the template and the search area using the derived step sizes. The step sizes determine which windows into the search area (or into manipulations or slices of the search area) are tested. Testing includes calculating a correlation coefficient between the selected window and the template. For correlations having a correlation coefficient exceeding a specific value, a more exhaustive, full search is performed locally in the vicinity of the selected window to see if a better match is found.

According to another aspect of the invention, step size for a rotational dimension is derived by calculating correlation coefficients between the padded template and the original template at various rotations of the padded template relative to the original template (along the x=0 and y=0 axis—the center of the padded template). At zero rotation the correlation coefficient is known to be one because the original template forms the center of the padded template. The original template is rotated in both positive and negative angular directions about the center. For each increment of rotation along a given angular direction a correlation coefficient is calculated. At some point the correlation coefficient will be the cut value (e.g., 0.5). The angular rotation spanning between the rotational angle along the positive rotation direction where the cut value is reached and the rotational angle along the negative rotation direction where the cut value is reached is the rotational width. In one example, one-half this rotational width is the CAPS rotational step size.

According to another aspect of the invention, step size for a scaling dimension is derived by calculating a correlation coefficient between the padded template and original template for various scalings of the original template relative to the padded template. The original template is relatively scaled from decreasing size to increasing size. The range of scaling is limited so that the relatively-scaled template is no larger than the padded template. The correlation coefficient is calculated between the scaled template and the padded template for several scaling factors in the decreasing and the increasing direction. When decreasing the scale of the template, a correlation coefficient corresponding to the cut value (e.g., 0.5) is reached for a given scaling factor. Similarly, when increasing the scale of the template, a correlation coefficient corresponding to the cut value (e.g., 0.5) is reached for a given scaling factor. The scaling width corresponds to the distance along the scaling axis between the correlation coefficients at the cut value. Since, the distance in the increasing direction may differ along the scaling axis from the distance along the decreasing direction, the scaling step size preferably is taken as the smaller of the two distances. In an alternative embodiment the scaling step size is the scaling width divided by two.

According to another aspect of the invention, step size for a subsampling resolution dimension is derived by calculating a correlation coefficient between the padded template and original template for various resolution-altered copies of the original template and padded template. The original template is sampled at a specific resolution. The padded template is sampled at the same resolution. The correlation coefficient is calculated between the original template and the padded template at the sampled resolution. This is repeated for several resolutions. In addition, at each resolution multiple correlation coefficients are derived. This is because when subsampling one data point is used to represent nxn data points. The correlation may differ depending on which of the nxn data points is used (or what interpolation of the points is used). The minimum correlation is considered for analysis. For a plot of the minimum correlation coefficient versus resolution, the minimum correlation is the highest at the center of the padded template for the original resolution. Moving along the resolution axis of the plot, the minimum correlation coefficient decreases to the cut value for some resolution sampling factor. Such resolution is the resolution step size.

With step sizes derived, a fast search then is performed. According to another aspect of the invention, matches are identified between the original template and the search area (image) using the three CAPS step sizes to select windows and a specific value of the correlation. The specific value used to identify a local match during the fast search is the cut value times a threshold value. The cut value is the same cut value used during the first analytical step described above, to derive statistics from the template. The threshold value is assigned based upon search area/image characteristics. Typical threshold values are between 0.8 and 0.9.

For a third dimension of the search, the search area is manipulated or resampled to include multiple slices (in effect a three dimensional set of data paints). Each slice corresponds to the search area in the third dimension (e.g., rotations scalings, subsampled copies). The potential number of slices depends on the resolution for the rotational angle, the scaling factor or the subsampling factor. Using the third-axis step size (e.g., rotation, scaling factor, subsampling factor), a subset of these potential slices are considered during the fast search. For example, of 300 potential slices where a third axis step size is 4, a subset of 75 slices is considered during the fast search.

Within each slice among the subset of slices, correlation coefficients are derived by selecting windows using the horizontal and vertical step sizes. Where the correlation coefficient equals at least the cut value times the threshold value, the location is used for another stage of evaluation. These locations are referred to herein as candidate locations and the slice from which this location was identified is referred to as its home slice.

At the next stage, the candidate locations identified in the fast search stage are projected onto neighboring slices of the search area within the full set of slices. For any given candidate location processed in the second stage, the neighboring slices include slices area less than the third dimension step size away from the home slice. Consider an implementation in which there are 300 potential rotations of the search area. Thus, there are 300 slices in the full set. Given an exemplary third dimension step size of 4 during the fast search stage, there are 75 slices in the first subset of slices. During stage two a given candidate location is projected onto the neighboring 3 slices to each direction of its home slice within the full set of slices. (Note that the 4th slice would have been the next slice in the subset of slices). The correlation coefficients for these points in these multiple neighboring slices (e.g., 6) then are calculated. If the coefficient is greater than one-half the threshold value for any of these neighboring slices, then the location for such slice becomes a candidate location also, and such slice is its home slice.

At the final stage, a local full search, correlation coefficients are derived for locations in the vicinity of each candidate location on the candidate location's home slice. The vicinity of a candidate location includes windows on the home slice that are less than a horizontal and vertical step size away from the candidate location. For example, if the horizontal step size is 2 and the vertical step size is two, then there are 8 locations (windows) in the vicinity of the candidate location, (e.g., window coordinate offsets of (–1, 0), (1,0), (0.1), (0.–1), (–1,1), (1,–1), (–1,–1), and (1,1) relative to candidate location). Coefficients which meet the threshold value are match points. A match point identifies a window of the search area matching the template.

One advantage of the invention is that template matches are found more quickly and with greater reliability than prior correlation search methods. In particular, this search methodology is more tolerant of noise and offsets of the template as demonstrated empirically by forming a search area from copies of templates altered by low pass filtering or Gaussian noise. These and other aspects and advantages of the invention will be better understood by reference to the following detailed description taken in conjunction with the accompanying drawings.

BRIEF DESCRIPTION OF THE DRAWINGS

FIG. 8 is a diagram of a circularly padded template;

FIG. 9 is a diagram of a linearly padded template;

FIG. 10 is a graph of a cross-sectional portion of the correlation between the template and the padded template of FIG. 8 or 9;

FIG. 11 is a diagram of a rotational step within a padded template;

DESCRIPTION OF SPECIFIC EMBODIMENTS

Exemplary Host Computer System

Figure 1:
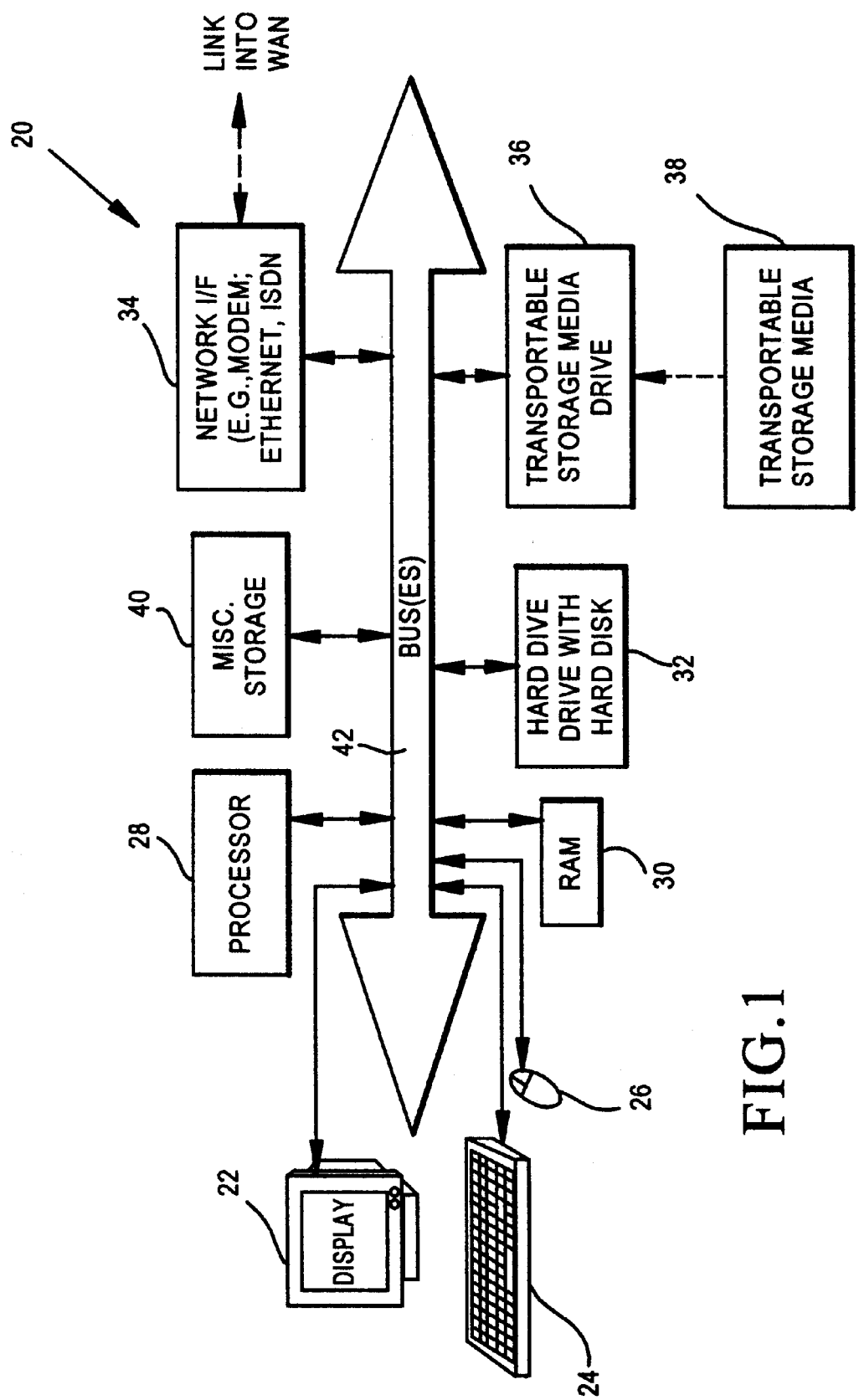
FIG. 1 is a block diagram of a host computer system for implementing the method embodiments of this invention.

The functions of the present invention preferably are performed by programmed digital computers of the type which are well known in the art, an example of which is shown in FIG. 1. A computer system 10 has a display monitor 12, a keyboard 14, a pointing/clicking device 16, a processor 18, random access memory (RAM) 20, a non-volatile storage device such as a hard disk drive 22, a communication or network interface 24 (e.g., modem; ethernet adapter), and a transportable storage media drive 26, such as a floppy disk drive, CD-ROM drive, zip drive, bernoulli drive or other magnetic, optical or other storage media, which reads transportable storage media 28. The various components interface and exchange data and commands through one or more busses 32. The computer system 10 receives information by entry through the keyboard 14, pointing/clicking device 16, the network interface 24 or another input device or input port. The computer system 10 may be any of the types well known in the art, such as a mainframe computer, minicomputer, or microcomputer.

Overview

Figure 2:
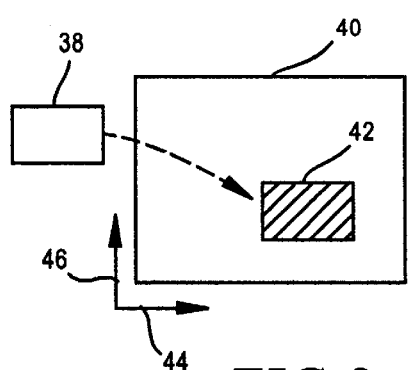
FIG. 2 is a diagram of a template and search area.

Referring to FIG. 2, to search for the location of a template 38 of data within a search area 40 of data, the template is overlaid onto a window 42 of the search area. The search area 40 is an image or another domain of data points. The window area 42 is a subportion of the search area. The template 38 also include a set of data points. The template data points are compared to the window's data points to determine if the data points correlate to a desired degree. If they do, then a match for the template has been found. In a search area 40 formed by 'm' rows of 'n' data points, a template formed by 'k' rows of 'p' data points may be translated along axes 44, 46 over (m–k+1) * (n–p+1) potential windows 42. For 3-dimensional analysis even more orientations may be formed between the template 38 and the search area 40.

To reduce the number of windows 42 that the template 38 is compared with, effective axial step sizes are derived from the template. For a two-dimensional search a step size along a first axis 44 is derived and a step size along a second axis 46 is derived. For a three dimensional search a step size along a third axis also is derived. Rather then compare the template to every possible window of the search area 40, the template 38 is moved along axes by corresponding axial step sizes.

Once the desired step sizes are derived, then the template 38 is compared to the various windows 42 of the search area 40 at the step size increments. In one embodiment the comparison is a correlation function of the template 38 and the window 42 and results in a correlation coefficient. Any window 42 in which the correlation coefficient with the template 38 is found to exceed a select value is a potential match for the template. In a preferred embodiment the select value equals the cut value times a threshold value. The threshold value is selected based upon the type of search area. Exemplary values are 0.8 to 0.9 although higher values less than one or lower values greater than the cut value may be used.

Exemplary third axes include a rotational axis, a scaling axis, a sampled resolution axis, a third spatial axis, a time axis, and a frequency axis. In each case the search area includes a third dimensional set of data points. For the rotational, scaling, and sampled resolution embodiments, the third dimensional points are manipulations of the original 2-dimensional search area The 2-d search area is rotated, scaled or sampled at a resolution. For the third spatial axis, time axis and frequency axis embodiment, the third dimensional data points corresponds to additional frames of data corresponding to the search area. In one embodiment additional 2-d spatial slices of a 3-d image along a z-axis are obtained. In another embodiment additional 2-d slices of the search area are obtained at different times. In still another embodiment additional 2-d slice of the search area are obtained for different frequencies.

Figure 3:
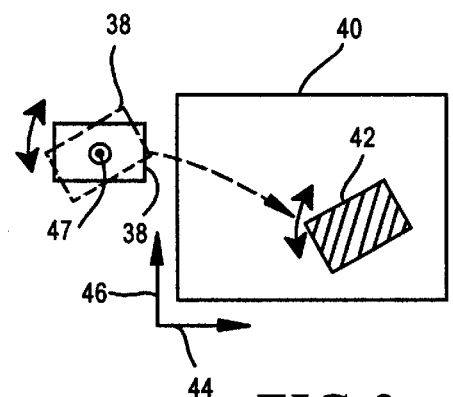
FIG. 3 is a block diagram of a template and search area for a 3-dimensional search along two linear axes and a rotational axis.
Figure 4:
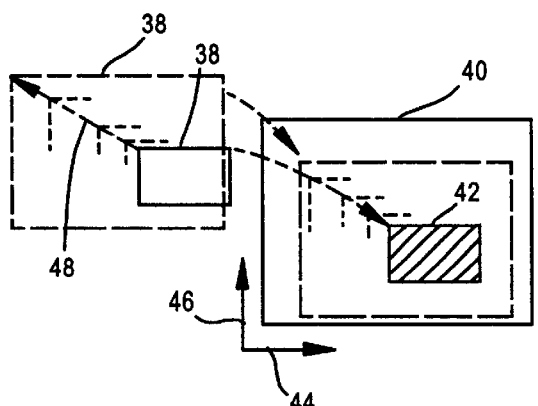
FIG. 4 is a block diagram of a template and search area for a 3-dimensional search along two linear axes and a scaling axis.
Figure 5:
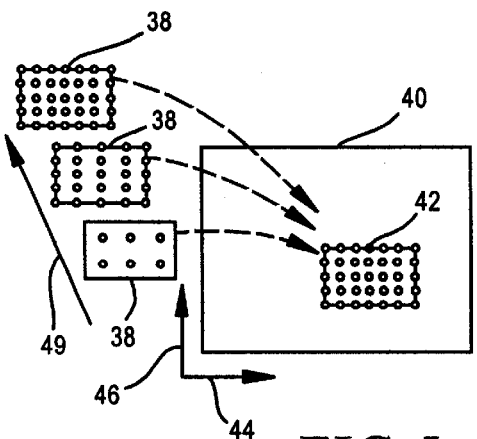
FIG. 5 is a block diagram of a template and search area for a 3-dimensional search along two linear axes and a sampled resolution axis.
Figure 6:
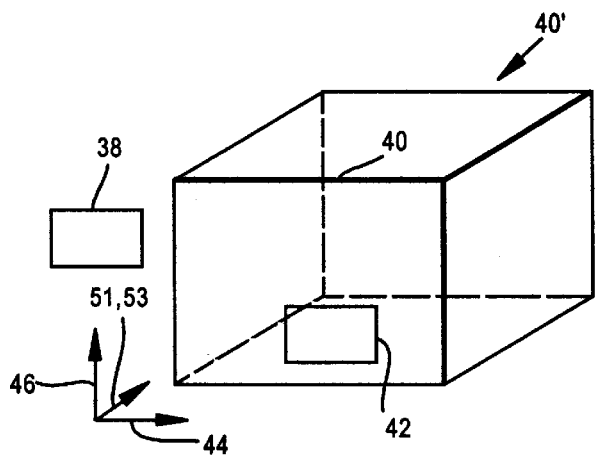
FIG. 6 is a block diagram of a template and search for a 3-dimensional search.

Referring to FIG. 3, the template 38 may be rotated relative to the search area 40 at various rotational offsets about a rotational axis 47. In this example the third axis corresponds to rotated slices of the sample area. Referring to FIG. 4, the template 38 may be scaled relative to the search area 40 along a scaling axis 48. In this example, the third axis corresponds to scalings of the search area. Referring to FIG. 5, the template 38 and search area 40 may be sampled at varying sample resolutions. In this example the third axis 49 corresponds to sampled resolution of the search area. Referring to FIG. 6, the search area 40 includes additional frames of data points along a third axis 51 corresponding to a third linear axis, samplings at different times or samplings at different frequencies.

In summary, the 3-D CAPS method includes searching for a match between the template 38 among a 3-dimensional sample space 40' in which the at least two axes 44, 46 are spatial axes and the third axis 53 corresponds to manipulations of the 2-D search area (relative to the template 38) or to additional frames of the 2-d search area 40 subject matter (see FIG. 6).

Determining Step Size for Horizontal and Vertical Axes

Figure 7:
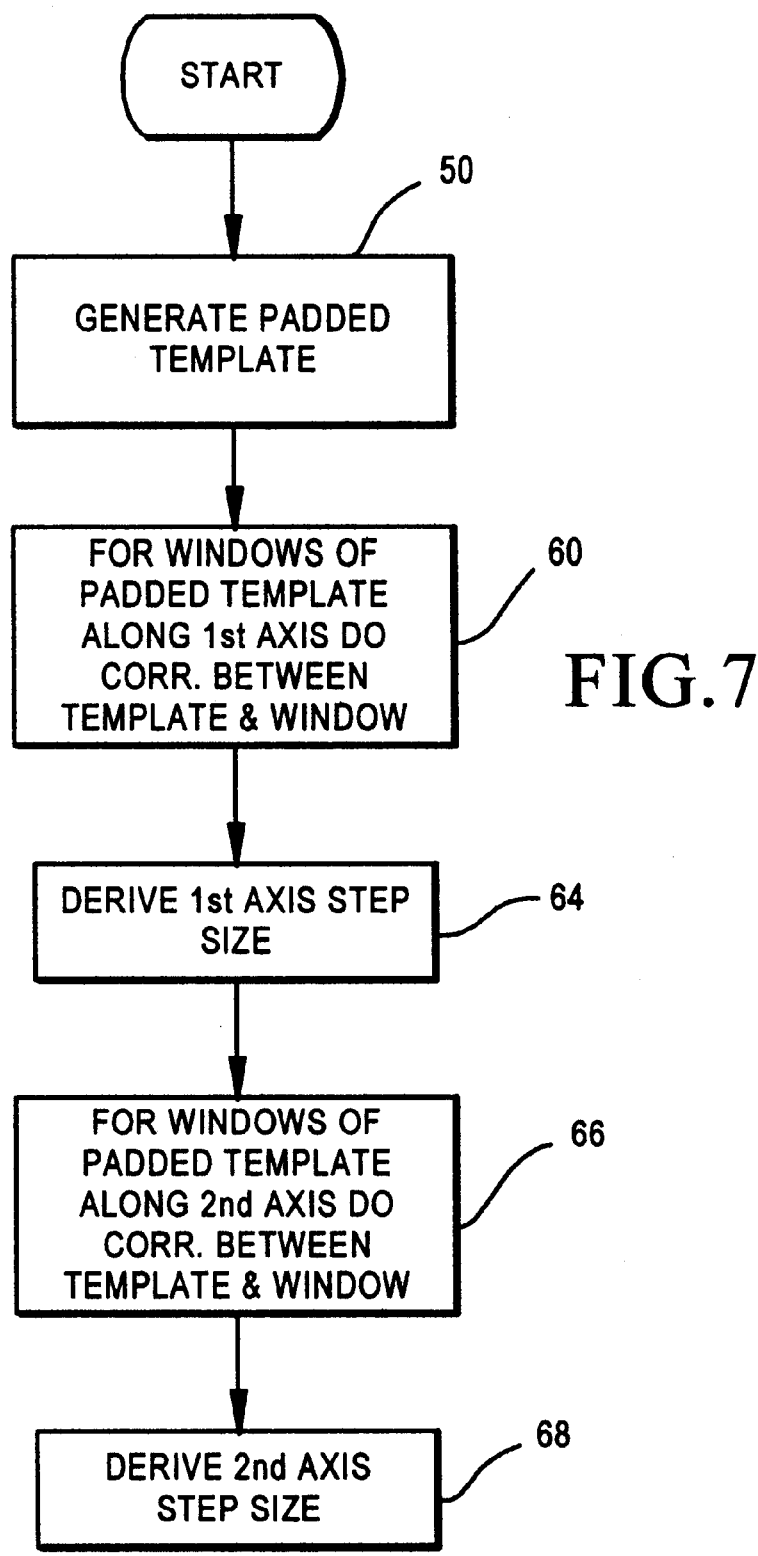
FIG. 7 is a flow chart of a process for determining CAPS step sizes according to an embodiment of this invention.

To determine effective step sizes, the template 38 itself is analyzed. Referring to FIG. 7, at a first step 50 the template 38 is padded with additional data points to achieve a padded template 52. FIG. 8 shows an example of a padded template 52' achieved by circular padding. For circular padding, multiple copies of the template 38 are used to increase the template size. In the illustrated embodiment an array of 9 copies of the original template 38 are used with a center window 54c of the padded template 52' being the original template 38. The number of copies may vary for differing embodiments. In a preferred embodiment there are at least 9 full copies of the template in the circularly padded template.

FIG. 9 shows an example of a padded template 52" achieved by linear padding. For linear padding, data points are added in which each data point has a common value. The common value is a padding constant. In one embodiment the padding constant may be 0 or another fixed value. In a preferred embodiment the padding constant is derived from the data values of the various data points which make up the template 38. For example, in one embodiment an average data value is derived for all the temple 38 data points using any of various averaging techniques. This average value serves as the padding constant. For image data, the added data points are pixels and the padding constant is a pixel intensity and/or color. Preferably the center window 54c of the padded template 52" formed by linear padding also is formed by the original template 38.

Referring again to FIG. 7, at another step 60 the template 38 is correlated to various windows 54 of the padded template 52. Because the center of the padded template 52 equals the original template 38, it is known that the correlation between the template 38 and the center window 54c is 1.0. Thus, that correlation need not be calculated. It is already known. For a two dimensional analysis, a correlation between the original template 38 and windows 54 of the padded template are derived for windows along either of such axes 44, 46 moving in either direction away from the center window 54c. The step size for selecting adjacent window to evaluate is one data point. Consider for example a template which is 40 pixels by 60 pixels and a padded template which is 120 pixels by 180 pixels. The step size is one pixel. Starting from the center window 54c, there are 40 potential windows in a first direction 56 along the first axis 44 and 40 potential windows in a second direction 58 along the same axis 44. In step 60 a correlation is performed between the template and the select windows. As the selected window 54 changes along the first axis 44 in a first direction 56, the resulting correlation coefficient is likely to decrease below 1.0. Eventually there will be a window where the correlation coefficient falls to a prescribed cut value. Such cut value may vary for differing embodiment, but preferably is less than a threshold value which identifies an estimated match between a window and the template. A window will be found in the padded template in each direction along axis 44 where the cut value is met.

Referring to FIG. 10, a graph of correlations between the padded template 52 and the template 38 along the first axis 44 shows a peak at the center and lesser values away from the center. The prescribed cut value is indicated as line 62. Line 62 intersects with at least two points on the correlation function. For circular padding there is likely to be more than 1 peak. The closest data point to each side of the maximum peak is used to measure a width along the first axis 44.

Rather than perform a correlation for each potential window along the first axis 44, correlations are performed for windows along the axis 44 away from the center window in each direction 56, 58 until a window is identified in such direction where the correlation coefficient intersects the cut value. For two dimensional analysis, there is a cut point found in each direction from the center window 54c along the first axis 44. The distance between those two windows in data points is the width along the first axis.

Referring to FIG. 7, at step 64 the first axis step size is derived from the width along the first axis 44 between windows which have a correlation to the template 38 equal to or less than the prescribed cut value. The step size along the first axis 44 is a fraction of the width. In a preferred embodiment, one-half the width is taken as the step size for the given axis. In other embodiments, the step size is taken as the entire width or some other fraction of the width.

In steps 66 and 68 the correlations are repeated along the second axis 46 in directions 70, 72 to find a width along the second axis 46. Referring again to FIG. 10, a graph of correlations between the padded template 52 and the template 38 along the second axis 46 shows a peak at the center and lesser values away from the center. The prescribed cut value is indicated as line 62. Line 62 intersects with at least two points on the correlation function. For circular padding there is likely to be more than 1 peak. The closest data point to each side of the maximum peak is used to measure a width along the first axis 46. For two dimensional analysis, there is a cut point found in each direction from the center window 54c along the second axis 46. The distance between those two windows in data points is the width along the second axis. A fraction of this distance is taken as the step size for the corresponding axis (e.g., first axis, or horizontal, step size; second axis, or vertical, step size). In a preferred embodiment, one-half the width is taken as the step size. In other embodiments, the step size is taken as the entire width or some other fraction of the width. Preferably, the step size along the second axis 46 is derived in the same manner as the step size along the first axis 44. The step sizes are referred to herein as correlative auto-predictive search ('CAPS') step sizes.

Determining Step Size for a Third Dimension

As presented above, the first axis (e.g., horizontal) and second axis (e.g., vertical) CAPS step sizes allow for x-y translation of a template 38 within a search area 40. In some applications, however, a template may not be just translated along x and y axes. The template also might be rotated relative to the search area. In another application the template may be at a different resolution than the search area or be scaled to a different size than the search area. In still another embodiment the search area may be a 3-dimensional image and the template may also be translated along a z-axis. In yet another embodiment the search area may by one in a sequence of time samples or frequency samples of an image or object, so that the third axis corresponds to time or frequency. For any of these embodiments, there may be multiple slices of a search area resulting in a three dimensional analysis. The slices may correspond to rotations, scalings, resolution samplings, an added linear dimension, or an added time or frequency dimension.

Determining Rotational Step Size

For three dimensional template matching, where the third dimension is rotation, a rotational CAPS step size is determined. The rotational step size is derived from a rotational width. To derive the rotational width a correlation coefficient is calculated between the padded template 52 (e.g., 52' or 52" of FIGS. 8 or 9) and the original template 38 along an x=0 and y=0 axis (e.g., which is selected to be the center of the padded template). Thus, at a rotation equal to 0 we know that the correlation coefficient is one, because the original template forms the center of the padded template. The original template then is rotated in both positive angular direction 78 and a negative angular direction 80 about the center of the padded template 52 (e.g., the rotational axis 47) as shown in FIG. 11. For each increment of rotation along a given angular direction a correlation coefficient is calculated. At some point the correlation coefficient will be the prescribed cut value (see FIG. 10). The angular rotation spanning between the rotational angle along the positive rotation direction where the window corresponding to the cut value is reached and the rotational angle along the negative rotation direction where the window corresponding to the cut-off value is reached is the rotational width. Such width is in data points. A fraction of this distance is taken as the rotational axis step size. In a preferred embodiment, one-half the rotational width is taken as the rotational axis step size. In other embodiments, the rotational step size is taken as the entire rotational width or some other fraction of the rotational width.

Determining Scaling Step Size

For three dimensional template matching, where the third dimension is scaling, a scaling CAPS step size is determined. The scaling step size is derived from a scaling width. Correlation coefficients are calculated between the padded template (52' or 52") and the template 38 rescaled by a scaling factor for each of multiple scaling factors. Each correlation along the scaling axis (z=scaling factor) preferably is performed at the x=0, y=0 window (e.g., which is selected to be the center of the padded template). As a result, it is known that at the original scaling of 1.0, the correlation coefficient is 1.0, since the original template forms the center of the padded template. The scaling factors may be less than 1 or greater than 1. For a scaling factor less than one, the template size is decreased. For a scaling factor greater than 1 the template size is increased. In one embodiment bilinear interpolation is used to rescale the template 38.

To achieve some amount of symmetry into the correlations along the scaling axis relative to the scaling factor=1 point, the correlations are analyzed relative to a variable a based on the following relationship:

$$s = (1+|a|)^{sign(a)}$$

where s is the scaling factor.

Figure 12:
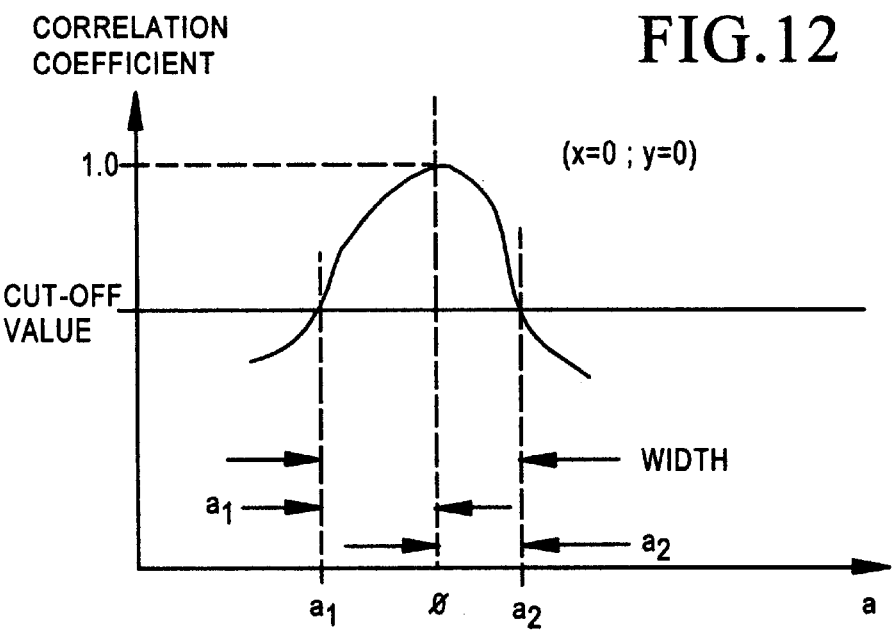
FIG. 12 is a graph of the correlation between the template and the padded template versus indexed scaling factor.

This results in the correlation coefficient being 1 at s=1 and a=0. For s less than 1, 'a' is negative. For s greater than 1, 'a' is positive. FIG. 12 shows a graph of the correlation coefficient versus 'a'. As the scaling factor, s, is varied to be less than 1, (i.e., negative 'a') the correlation coefficient decreases away from 1. Similarly, as the scaling factor, s, is varied to be greater than 1, (i.e., positive 'a') the correlation also decreases away from 1. In each direction, there will come a scaling factor and 'a' value at which the correlation coefficient is the cut value (e.g., 0.5). These points are labeled a1 and a2 in FIG. 12. The distance between a1 and a2 is the scaling width. In one embodiment the step size in units 'a' is one-half this scaling width. The step size is scaling factor units is derived using the relationship between scaling factor, s, and 'a'. It has been observed, however, that the two ranges of scaling factors (less than 1 and greater than 1) are not symmetric. To assure an accurate search, the smaller distance of a1 and a2 is used to determine the scaling step size. For example, in an embodiment in which a1 is −0.32 and a1 is 0.27, then 0.27 is used. Specifically, 0.27 is converted to the scaling factor 1.27 and used as the scaling step size. Thus, the template is to be scaled up by a factor of 1.27 or scaled down by a factor $1.27^{-1}$ (i.e., 1/1.27=0.79).

Determining Subsampling Factor (Resolution) Step Size

For three dimensional template matching, where the third dimension is a subsampling factor which determines resolution, a sample resolution CAPS step size is determined. The sample resolution step size is derived from a subsampling factor width identified in a plot of correlation coefficient versus sample resolution. Correlation coefficients are calculated between the padded template (52' or 52") and the template 38 at each of varying resolutions (e.g., subsampling factors). For each calculation both the template 38 and the padded template 52 are sampled at a given resolution. Each correlation preferably is performed at the x=0, y=0 window (e.g., which is selected to be the center of the padded template). As a result, it is known that at the original resolution the correlation coefficient is 1.0, since the original template forms the center of the padded template.

Consider a subsampling factor n. For each subsampling factor, the template is subsampled by a factor 'n' to form a subtemplate. Also, the padded template is subsampled by the same factor, n, to form a padded subtemplate. A correlation is performed between the subsampled template and the subsampled padded template at the x=0, y=0) location for each of multiple subsampling factors (e.g., resolutions). Since the center of the padded template is the original template, one might expect that the x=0, y=0 location of the subsampled template and padded template would have a correlation of 1.0. However, in subsampling the template and padded template, there are $n^2$ different ways to perform the 2D subsampling (i.e., one sample point to represent an (n×n) original image area, while $n^2-1$ sample points are discarded). To assure accurate template matching, even in a worst case scenario, the minimum correlation coefficient resulting from the $n^2$ different ways is used. Thus, the resulting correlation coefficient at the x=0, y=0 location may be less than 1.

Figure 13:
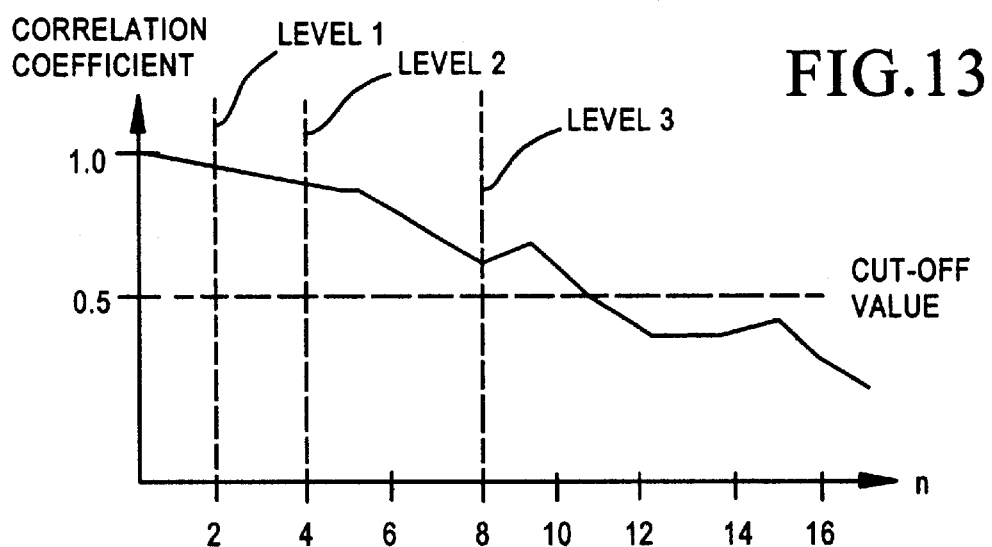
FIG. 13 is a graph of the correlation between the template and the padded template versus subsampling factor.

Referring to FIG. 13, the correlation coefficient is plotted against the subsampling factor. The correlation coefficient is the minimum correlation among the possible ways of subsampling for a given subsampling factor, as described above. In terms of a hierarchical level, the primary level 0 corresponds to a subsampling factor of n=1. A next level corresponds to n=2. The next level corresponds to n=4, then n=8, and so on in the ratio $n=2^{(level)}$. The levels are delineated on FIG. 13. In a preferred embodiment the resolution step size is selected to be the factor n corresponding to one of the hierarchical levels. A reliable hierarchical level is determined by the cut value. For a cut value of 0.5 as shown in FIG. 13, the hierarchical matching can go to the third level, n=8. Thus, in this example, the resolution step size is a subsampling ratio of 8. Note that to derive the resolution step size, the correlation coefficients do not need to be calculated for every value of n. They are calculated for the subsampling factors corresponding to the hierarchical levels, n=1, 2, 4, 8, 16, . . . .

Template Matching With Rotational Analysis

For 3-dimensional template matching with rotational analysis a rotational step size is derived as described above. In addition, the horizontal and vertical step sizes are calculated as described above, using a rotational angle of 0. With the three CAPS step sizes derived, template matching then is performed. In one embodiment, template matching locations are derived between the original template 38 and the search area 40 using the three CAPS step sizes and a threshold value for the three directions (e.g., two translational and one rotational).

When performing the rotation, the template 38 may be rotated relative to a fixed search area or the search area may be rotated relative to a fixed template. It has been found that rotating the search area leads to faster overall computation and also enables parallelization of the computation process. Even though the template is smaller, rotating the template requires derivation of an alpha mask for each rotation increment. In practice the preferred choice of rotating the search area or the template depends on the relative size of the template and the search area, (e.g., the smaller the template the faster the computation of the alpha mask's at the various rotations).

Described herein is a process in which the search area is rotated, (i.e., the third axis of space 40' corresponds to rotational offset copies of the search areas 40). For a given implementation, the search area potentially may be rotated at a fixed interval (i.e., angular resolution) to achieve to a set of rotated search areas. These search area rotations are referred to herein as 'slices'. The number of slices depends upon the angular resolution. In one embodiment the angular resolution is derived from the template, as:

$$\delta\theta = (2\pi)/[2\pi*\max(tx,ty)]_{round\ up}$$

where, tx and ty are the width and height of the template, respectively 'round up' means to round up the value in [ ] to a next integer.

The denominator is the total number of rotated templates, slices, that are to be searched. The presence of the scaling factor $2\pi$ gives an angular resolution in radians. At the angular resolution, there are 'h' potential rotation positions and thus 'h' number of slices for the search area 40. Using the rotational step size only a subset of these potential slices are considered during an initial evaluation stage. For example, of 270 potential slices where a rotational step size is 3, a subset of 90 slices is considered in the initial evaluation stage. Thus, at one step the search area 40 is rotated by the rotational step size to derive a first subset of search area slices at differing rotational angles.

With the subset of slices identified, a two-dimensional analysis is performed in each slice of the subset. Using the first axis step size and second axis step size, correlations are performed between the template 38 and various windows of a given slice of the subset. This is done for each slice of the subset. For each correlation a correlation coefficient is computed. If the correlation coefficient meets or exceeds a select value, then the corresponding window is a candidate match. The select value preferably is less than the threshold value used for finally determining a template match. In one embodiment the select value equals one-half the threshold value, although other values may be used. The lower the select value the more candidate matches that are to be found. There may be 0 or more candidate matches per slice in the subset. The location of a candidate match is referred to as a candidate location. The slice from which the candidate match was identified is referred to herein as its home slice.

Figure 14:
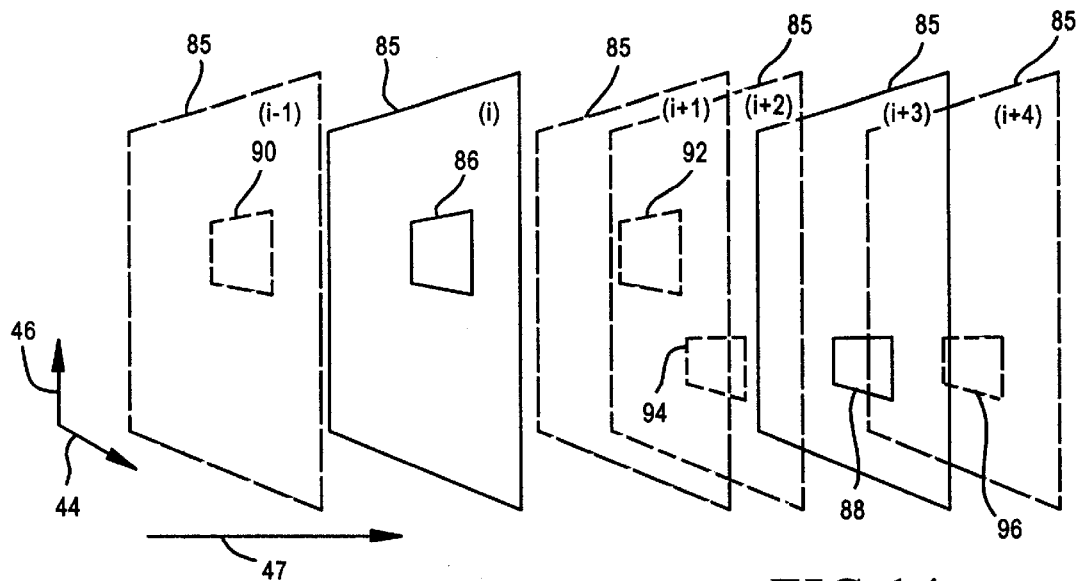
FIG. 14 is a diagram of multiple slices of the search area of FIG. 6.

Referring to FIG. 14, several slices 85 of an entire set of potential slices are shown. With a rotational step size, for example, of three, every third slice is in the subset of slices used for the initial stage of evaluation. Slices 'i' and 'i+3' are part of such subset. Consider an example where a candidate match is found for window 86 of slice i and window 88 of slice i+3.

At the next stage, the candidate locations (e.g., windows 86 and 88) identified in the first stage are projected onto neighboring slices of the search area within the full set of slices. For any given candidate location processed in this second stage, the selected neighboring slices include rotations of the search area less than the rotational step size. Referring to FIG. 14, where the rotational step size is 3, the candidate locations 86, 88 are projected as windows onto one or more neighboring slices in each direction. The projection would not extend to the rotational step size (e.g., 3) because that would project the candidate location onto one of the slices in the subset. Such slice has already been tested for candidate matches. Shown is a projection onto the nearest neighbor. Thus candidate location 86 from slice i is projected onto slices i−1 and i+1 as widows 90, 92. Candidate location 88 from slice i+3 is projected onto slice i+2 and i+4 as windows 94, 96. In another embodiment, candidate location 86 from slice i is projected onto slices i−2, i−1, i+1, and i+2, while candidate location 88 from slice i+3 is projected onto slice i+1, i+2, i+4, and i+5.

A correlation is performed between the template 38 and the projections. If any of the resulting correlation coefficients meet or exceed the second threshold, then the projections also are candidate locations. The slice that the projection is in is referred to as its home slice. At this point in the process, there are 1 or more candidate locations—(0 candidates if the template does not have a match).

Next, a third stage of processing is performed. First, any of the candidate locations which has a correlation coefficient meeting or exceeding the threshold value is a potential match. In some embodiments, it is considered a match. In addition, two dimensional analysis is performed in the vicinity of each candidate location relative to its respective home slice to identify other potential matches. The two dimensional analysis for a given candidate location is a correlation between the original template 38 and windows of the candidate location's home slice in the vicinity of the candidate location. Such windows are selected using reduced CAPS steps sizes along the first and second axis. In one embodiment a step size of 1 is used. During this stage, the resulting correlation coefficients are compared to the threshold value. Any window of a given home slice being tested where the correlation coefficient meets or exceeds the threshold value is a potential match. In some embodiments, it is considered a match. In other embodiments, the window or windows having the highest correlation which meet or exceed the threshold value are the matches.

Figure 15:
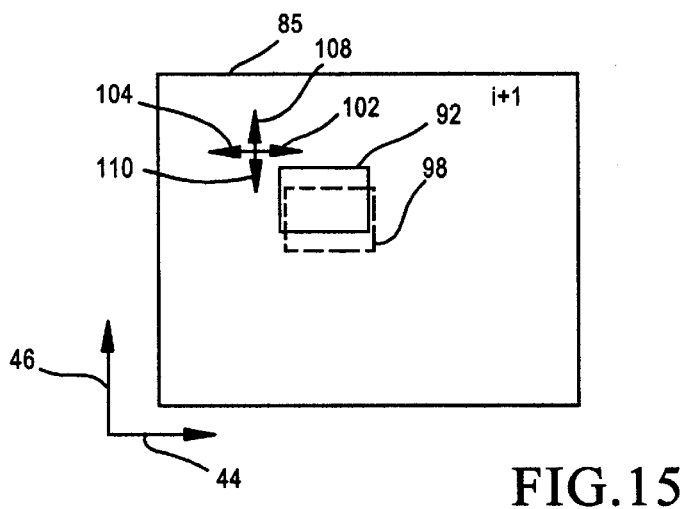
FIG. 15 is a diagram depicting stepping within the neighborhood of a candidate window for a given slice of FIG. 14.

The third stage two-dimensional analysis is described with regard to FIG. 15 and the candidate location 92 of slice i+1. The same process is applied for each candidate location which is a projection onto an intermediary slice (between slices of the subset of slices 85). For a given candidate location, the windows which are within a 2-dimensional area bounded by the step sizes (for the respective axes) are tested by a local full search. Note that the windows which are exactly a step size away along either axis 44, 46 were already tested. To do the local full search we test all the intermediary windows in the area between the local match and the windows plus or minus one step size away along either axis 44, 46. For example, given a first axis step size of x and a second axis step size of y, the windows having a center point which are ±0, 1, 2, . . . , x−1 data points away from the locally matched window along the first axis, and ±0, 1, 2, . . . , y−1 data points away from the locally matched window along the second axis, are tested during the full search. Although, the local match need not be recorrelated.

Figure 16:
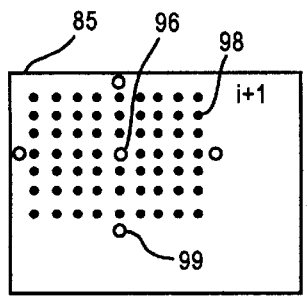
FIG. 16 is a diagram of the window center points about which the template is overlaid during a local full search within the slice of FIG. 15.

Referring to FIG. 16, the window corresponding to the local match has a center data point 96. The template is moved at a step interval of one data point in either direction along either axis up to but not including the data point which in one step size away. As the template is moved over this area, the windows tested during the local full search will have a center data point 98. FIG. 16 shows all the center points 98 for a given local full search as black dots for an implementation in which the first axis step size is five and the second axis step size is four. FIG. 16 shows the nearby center points from the fast search as open dots 99.

A correlation is performed between the template 38 and each window in the vicinity of the candidate match. For the vicinity shown in FIG. 16 in which the horizontal CAPS step size is 5 (used in the initial stage and second stage of the 3-dimensional template matching process) and the vertical CAPS step size is 4 (used in the initial stage and second stage of the 3-dimensional template matching process), there are 62 additional windows tested. Any of the additional 62 windows which has a correlation coefficient which equals or exceeds the threshold value is a match of the template. Alternatively, of the windows where the correlation coefficient exceeds the threshold value, only the window or windows having the highest correlation coefficient(s) are selected as matches. For example, one or more windows may have the same correlation coefficient which is highest. As another example the windows corresponding to the top 'n' correlation coefficients may be selected, where each window correlation coefficient also exceeds the threshold value.

Template Matching With Scaling Analysis

For 3-dimensional template matching in which the third dimension is a scaling factor, different slices of the search area are searched in which each slice has a different scaling factor. For a given implementation, the search area potentially may be scaled at a fixed interval to achieve to a set of scaled search areas. The number of slices depends upon the scaling resolution. In one embodiment the scaling resolution is derived from the template. For example if the template is a 64×64 pixel image, then the scaling resolution is 1/64. Using the scaling step size only a subset of these potential slices are considered during an initial evaluation stage. For example, of 270 potential slices where a scaling interval step size is 3 (in units of the scaling resolution), a subset of 90 slices is considered in the initial evaluation stage. The initial evaluation, along with the second stage and local full search stages of the analysis are similar to that described above for the rotational analysis.

In the initial evaluation with the subset of slices identified, a two-dimensional analysis is performed in each slice of the subset. Using the first axis step size and second axis step size, correlations are performed between the template 38 and various windows of a given slice of the subset. This is done for each slice of the subset. For each correlation a correlation coefficient is computed. If the correlation coefficient meets or exceeds a select value, then the corresponding window is a candidate match. The select value preferably is less than the threshold value used for finally determining a template match. In one embodiment the select value equals one-half the threshold value, although other values may be used. The lower the select value the more candidate matches that are to be found. There may be 0 or more candidate matches per slice in the subset. The location of a candidate match is referred to as a candidate location. The slice from which the candidate match was identified is referred to herein as its home slice.

Referring to FIG. 14, several slices 85 of an entire set of potential slices are shown. With a scaling step size, for example, of three, every third slice is in the subset of slices used for the initial stage of evaluation. Slices 'i' and 'i+3' are part of such subset. Consider an example where a candidate match is found for window 86 of slice i and window 88 of slice i+3.

At the next stage, the candidate locations (e.g., windows 86 and 88) identified in the first stage are projected onto neighboring slices of the search area within the full set of slices. For any given candidate location processed in this second stage, the selected neighboring slices include scalings variations of the search area less than the scaled step size. Referring to FIG. 14, where the scaling step size is 3, the candidate locations 86, 88 are projected as windows onto one or more neighboring slices in each direction. The projection would not extend to the scaling step size (e.g., 3) because that would project the candidate location onto one of the slices in the subset. Such slice has already been tested for candidate matches. Shown is a projection onto the nearest neighbor. Thus candidate location 86 from slice i is projected onto slices i−1 and i+1 as widows 90, 92. Candidate location 88 from slice i+3 is projected onto slice i+2 and i+4 as windows 94, 96. In another embodiment, candidate location 86 from slice i is projected onto slices i−2, i−1, i+1, and i+2, while candidate location 88 from slice i+3 is projected onto slice i+1, i+2, i+4, and i+5.

A correlation is performed between the template 38 and the projections. If any of the resulting correlation coefficients meet or exceed the select value, then the projections also are candidate locations. The slice that the projection is in is referred to as its home slice. At this point in the process, there are 1 or more candidate locations—(0 candidates if the template does not have a match).

Next, a third stage of processing is performed. First, any of the candidate locations which has a correlation coefficient meeting or exceeding the threshold value is a potential match. In some embodiments, it is considered a match. In addition, two dimensional analysis is performed in the vicinity of each candidate location relative to its respective home slice to identify other potential matches. The two dimensional analysis for a given candidate location is a correlation between the original template 38 and windows of the candidate location's home slice in the vicinity of the candidate location. Such windows are selected using reduced CAPS steps sizes along the first and second axis. In one embodiment a step size of 1 is used. During this stage, the resulting correlation coefficients are compared to the threshold value. Any window of a given home slice being tested where the correlation coefficient meets or exceeds the threshold value is a potential match. In some embodiments, it is considered a match. In other embodiments, the window or windows having the highest correlation which meet or exceed the threshold value are the matches.

The third stage two-dimensional analysis is described with regard to FIG. 15 and the candidate location 92 of slice i+1. The same process is applied for each candidate location which is a projection onto an intermediary slice (between slices of the subset of slices 85). For a given candidate location, the windows which are within a 2-dimensional area bounded by the step sizes (for the respective axes) are tested by a local full search. Note that the windows which are exactly a step size away along either axis 44,46 were already tested. To do the local full search we test all the intermediary windows in the area between the local match and the windows plus or minus one step size away along either axis 44, 46. For example, given a first axis step size of x and a second axis step size of y, the windows having a center point which are ±0, 1, 2, . . . , x−1 data points away from the locally matched window along the first axis, and ±0, 1, 2, . . . , y−1 data points away from the locally matched window along the second axis, are tested during the full search. Although, the local match need not be recorrelated.

Referring to FIG. 16, the window corresponding to the local match has a center data point 96. The template is moved at a step interval of one data point in either direction along either axis up to but not including the data point which in one step size away. As the template is moved over this area, the windows tested during the local full search will have a center data point 98. FIG. 16 shows all the center points 98 for a given local full search as black dots for an implementation in which the first axis step size is five and the second axis step size is four. FIG. 16 shows the nearby center points from the fast search as open dots 99.

A correlation is performed between the template 38 and each window in the vicinity of the candidate match. For the vicinity shown in FIG. 16 in which the horizontal CAPS step size is 5 (used in the initial stage and second stage of the 3-dimensional template matching process) and the vertical CAPS step size is 4 (used in the initial stage and second stage of the 3-dimensional template matching process), there are 62 additional windows tested. Any of the additional 62 windows which has a correlation coefficient which equals or exceeds the threshold value is a match of the template. Alternatively, of the windows where the correlation coefficient exceeds the threshold value, only the window or windows having the highest correlation coefficient(s) are selected as matches. For example, one or more windows may have the same correlation coefficient which is highest. As another example the windows corresponding to the top 'n' correlation coefficients may be selected, where each window correlation coefficient also exceeds the threshold value.

Template Matching With Resolution Subsampling Analysis

For 3-dimensional template matching in which the third dimension is a subsampling resolution factor, a slice of the search area is obtained by subsampling the search area using the derived subsamnpling factor (see section—Determining Subsampling Factor (Resolution) Step Size). In addition, the template is subsampled using the subsampling factor. This slice and the subsampled template correspond to a reliable subsampling level.

In a first stage a full search is performed between the template and the search area slice at the reliable subsampling level. More specifically, correlations are performed between the subsampled template and all potential windows of the subsampled search area. For each correlation a correlation coefficient is computed. If the correlation coefficient meets or exceeds a select value, then the corresponding window is a candidate location. The select value preferably is less than the threshold value used for finally determining a template match. In one embodiment the select value equals one-half the threshold value, although other values may be used. The lower the threshold value the more candidate locations that are to be found.

At the next stage of analysis, the candidate locations identified in the first stage are projected onto the original search area (i.e., the primary image which is not subsampled) to delineate areas of the original search area to be tested. For example, if the subsampling factor at the reliable subsampling level is 8 (i.e., n=8), then for each data point in such reliable subsampling level, there are $n^2$ data points in the original search area. Thus, in this example there are 64 windows in the original search area corresponding to each candidate location.

For each of the candidate locations, a two dimensional analysis is performed in the vicinity of each of the projected candidate locations (in the original search area) to identify potential template matches. The vicinity corresponds to the $n^2$ (e.g., 64) potential windows. At one step of the two dimensional analysis the first axis step size and the second axis step size are used to select a subset of windows among the $n^2$ windows corresponding to the projected candidate location. Any of such $n^2$ windows for which a correlation coefficient meets or exceeds the select value is a final candidate.

For each final candidate a two dimensional local full search is performed in the vicinity of each final candidate match. The vicinity at this step corresponds to all the intermediary windows in the area between the final candidate and the windows plus or minus one step size away along either axis. For example, given a first axis step size of x and a second axis step size of y, the windows having a center point which are ±0, 1, 2, . . . , x−1 data points away from the locally matched window along the first axis, and ±0, 1, 2, . . . , y−1 data points away from the locally matched window along the second axis, are tested during the full search. Note that x and y should each be less than n. The window having the highest correlation coefficient above the threshold value, if any, is a match. In various embodiment there may be zero or more matches found for each candidate match. In some embodiments only the window or windows having the highest correlation coefficient (relative to the original template) are selected as the template match. In other embodiments all windows having a correlation coefficient exceeding the threshold value are template matches.

Implementing the Correlation Function

The correlation coefficient for a correlation between two data sets 'a' and 'b' is defined below. The data set 'a' is the template 38 or an estimate or coarse representation of the template. In a preferred embodiment it is the template 38. The data set 'b' is a window of the padded template 52 (or of a rotational offset of the padded template) for the process of finding the CAPS step sizes. The data set 'b' is a window of the search area 40 (or of a rotational offset of the search area) for the process of identifying candidate locations, potential template matches or template matches. Each of data sets 'a' and 'b' may be a matrix, image or another set of data points. The correlation coefficient, corr is:

$$corr = \frac{E\{[a - E(a)] * [b - E(b)]\}}{sd(a) * sd(b)}$$

which may be simplified to $$corr = \frac{E(a * b) - E(a) * E(b)}{sd(a) * sd(b)}$$

where $E(x)$ = expected value of data set $(x)$ $sd(x)$ = standard deviation of data set $(x)$ and $corr$ is between $-1.0$ and $+1.0$.

Meritorious and Advantageous Effects

One advantage of the invention is that template matches are found more quickly and with greater reliability than prior correlation search methods. In particular, this search methodology is more tolerant of noise and offsets of the template as demonstrated empirically by forming a search area from copies of templates altered by lowpass filtering or Gaussian noise.

Although a preferred embodiment of the invention has been illustrated and described, various alternatives, modifications and equivalents may be used. For example, although third dimensional analyses are described above for rotation, scaling and resolution, additional third dimensional analyses which may be implemented according to this invention, include another spatial dimension (e.g., z axis to achieve 3 orthogonal axes), time (e.g., motion within sequential frames), or frequency bands (e.g., satellite pictures taken with different frequency bands, such as from millimeter to infrared or ultraviolet frequency bands). In addition, template matching for additional dimensions beyond 3 also may be performed. Therefore, the foregoing description should not be taken as limiting the scope of the inventions which are defined by the appended claims.

What is claimed is:

1. A method for locating a match between a first template of data and a search area of data, the first template including a first plurality of data points, the search area including a second plurality of data points exceeding in number the first plurality of data points, the method comprising the steps of:

padding the first template with additional data to enlarge the template into a padded template, wherein a first window area within the padded template is formed by the first template and includes the first plurality of data points;

correlating the first template to window areas within the padded template along a first axis about the first window area to derive a first step size;

correlating the first template to window areas within the padded template along a second axis about the first window area to derive a second step size;

deriving a third step size from the first template and the padded template;

using first step size, second step size and third step size to select windows of the search area to evaluate for a template match.

2. The method of claim 1, in which the step of deriving a third step size comprises:

correlating the first template to window areas within the padded template along a third axis about the first window area to derive the third step size.

3. The method of claim 2, in which the first axis and second axis are linear axes and the third axis is a rotational axis.

4. The method of claim 2, in which the first axis and second axis are linear axes and the third axis corresponds to time.

5. The method of claim 2, in which the first axis and second axis are linear axes and the third axis corresponds to frequency.

6. The method of claim 1, in which the first axis, second axis and third axis are orthogonal spatial axes.

7. A method for locating a match between a first template of data and a search area of data, the first template including a first plurality of data points, the search area including a second plurality of data points exceeding in number the first plurality of data points, the method comprising the steps of:

padding the first template with additional data to enlarge the template into a padded template, wherein a first window area within the padded template is formed by the first template and includes the first plurality of data points;

correlating the first template to window areas within the padded template along a first axis about the first window area to derive a first step size;

correlating the first template to window areas within the padded template along a second axis about the first window area to derive a second step size;

deriving a third step size from the first template and the padded template; and using first step size, second step size and third step size to select windows of the search area to evaluate for a template match;

in which the step of deriving a third step size comprises:

(i) subsampling the first template and the padded template for a plurality of subsampling factors;

(ii) for each subsampling factor, correlating the subsampled first template to a window area within the subsampled padded template to achieve a correlation coefficient corresponding to the subsampling factor; and (iii) deriving a third step size based upon the each of the respective correlation coefficients corresponding to the subsampling factors.

8. A method for locating a match between a first template of data and a search area of data, the first template including a first plurality of data points, the search area including a second plurality of data points exceeding in number the first plurality of data points, the method comprising the steps of:

padding the first template with additional data to enlarge the template into a padded template, wherein a first window area within the padded template is formed by the first template and includes the first plurality of data points;

correlating the first template to window areas within the padded template along a first axis about the first window area to derive a first step size;

correlating the first template to window areas within the padded template along a second axis about the first window area to derive a second step size;

deriving a third step size from the first template and the padded template; and using first step size, second step size and third step size to select windows of the search area to evaluate for a template match;

in which the step of deriving a third step size comprises:
        (i) scaling one of the first template and the padded template relative to the other of the first template and the padded template for each one of a plurality of scaling factors;
        (ii) for each scaling factor, correlating the scaled one of the first template and the padded template to the other one of the first template and the padded template at a first window to achieve a correlation coefficient corresponding to the scaling factor; and
        (iii) deriving a third step size based upon the each of the respective correlation coefficients corresponding to the scaling factors.

9. The method of claim 1, in which the search area is a two dimensional search area, and in which the step of using the first step size, second step size and third step size, comprises:

deriving search area slices from the two dimensional search area to achieve a three dimensional search area, wherein the two dimensional search area is one slice of the three dimensional search area.

10. The method of claim 9, in which the step of using the first step size, second step size and third step size further comprises:

selecting a subset of slices from all the slices forming the three dimensional search area using the third step size;

for each one slice within the subset of slices, selecting a subset of window areas within said each one slice to evaluate for locating a match to the first template, wherein the first step size and second step size are used for selecting the subset of window areas; and correlating each one window of the selected subset of windows to the first template.

11. The method of claim 10, further comprising the step of:

identifying as a potential template match each of the correlated window areas for which the correlation to the first template results in a correlation coefficient exceeding a predetermined value.

12. A method for locating a match between a first template of data and a search area of data, wherein the search area is a two dimensional search area, the first template including a first plurality of data points, the search area including a second plurality of data points exceeding in number the first plurality of data points, the method comprising the steps of:

padding the first template with additional data to enlarge the template into a padded template, wherein a first window area within the padded template is formed by the first template and includes the first plurality of data points;

correlating the first template to window areas within the padded template along a first axis about the first window area to derive a first step size;

correlating the first template to window areas within the padded template along a second axis about the first window area to derive a second step size;

deriving a third step size from the first template and the padded template; and using first step size, second step size and third step size to select windows of the search area to evaluate for a template match, wherein the step of using the first step size, second step size and third step size, comprises:
        (i) deriving search area slices from the two dimensional search area to achieve a three dimensional search area, wherein the two dimensional search area is one slice of the three dimensional search area;
        (ii) selecting a subset of slices from all the slices forming the three dimensional search area using the third step size;
        (iii) for each one slice within the subset of slices, selecting a subset of window areas within said each one slice to evaluate for locating a match to the first template, wherein the first step size and second step size are used for selecting the subset of window areas; and
        (iv) correlating each one window of the selected subset of windows to the first template;

and the method further comprising the steps of:

identifying as a potential template match each of the correlated window areas for which the correlation to the first template results in a correlation coefficient exceeding a predetermined value, in which for any given one of the potential template matches, there is a home slice within which such given one of the potential template matches is located;

for each one potential template match, projecting said one potential match onto neighboring slices within the three dimensional search area which are less than the third step size away from the home slice of said one potential template match to achieve a test subset of windows among the neighboring slices, for each one potential template match, correlating the first template to each window among the test subset of windows for said one potential template match, and identifying as another potential template match each of the correlated windows among the test subset of windows for which the correlation to the first template results in a correlation coefficient exceeding the predetermined value, wherein the slice of said neighboring slices which includes said another potential template match is the home slice for said another potential template match.

13. The method of claim 12, wherein the subset of windows is a first subset of windows, wherein each one potential template match and each one of said another template matches is a candidate match, and further comprising the step of:

for each one candidate match, selecting a second subset of window in the vicinity of the candidate match;

correlating each one of the window areas among the selected second subset of window areas to the first template.

14. The method of claim 13, further comprising the step of:
    identifying as a template match one or more of the correlated window areas among the second subset for which the correlation to the first template results in a correlation coefficient which exceeds a threshold value.

15. The method of claim 14, in which the template match is selected to be the window among the second subset of windows for which the correlation to the first template results in a highest correlation coefficient which exceeds the threshold value.

16. The method of claim 13, wherein the vicinity of said one candidate match corresponds to all potential windows on the home slice of said one candidate match that are less than the first step size away from said one candidate match moving parallel to the first axis and are less than the second step size away from said one candidate match moving parallel to the second axis.

17. The method of claim 1, in which the search area is a two dimensional search area having a first resolution, and further comprising the steps of:
    deriving a subsampled search area by using the third step size as a resolution subsampling factor for subsampling the two dimensional search area at a second resolution differing from the first resolution;
    deriving a subsampled template by using the third step size as a subsampling factor to subsample the first template at the second resolution;
    wherein a window of the subsampled search area includes data points of the subsampled search area which are within an area determined by an overlay of the subsampled template onto the subsampled search area, and wherein a set of all potential windows of the subsampled search area includes all potential areas which may be overlayed by the subsampled template;
    for each one window among the set of all potential windows of the subsampled search area, correlating the first template to said one window to derive a correlation coefficient; and
    identifying as a candidate location each one window of the set of all potential windows for which the correlation coefficient exceeds a predetermined value.

18. The method of claim 17, in which the subsampled search area comprises a plurality of data points, each one data point of the plurality of data points corresponding to $n^2$ data points of the two dimensional search area, wherein n equals the third step size, and further comprising the steps of:
    for each one candidate location in the subsampled search area, selecting a first subset of windows in the two dimensional search area corresponding to said one candidate location in the subsampled search area to achieve at least one first subset of windows;
    for each of said at least one first subset of windows, selecting a second subset of windows using the first step size and the second step size; and
    identifying as a candidate match each window among the second subset of windows which correlates to the first template with a correlation coefficient which exceeds the predetermined value.

19. The method of claim 18, further comprising the steps of:
    for each one candidate match, selecting a third second subset of windows in the vicinity of the candidate match;
    correlating each one of the window areas among the selected third subset of window areas to the first template.

20. The method of claim 19, further comprising the step of:
    identifying as a template match one or more of the correlated window areas among the third subset for which the correlation to the first template results in a correlation coefficient which exceeds a threshold value.

21. A method for locating an estimated template match between a first template of data and a template matching window within a first search area of data, the first template including a first plurality of data points organized into an array spanning a first axis and a second axis, the first plurality of data points spaced to a first precision along the first axis and a second precision along the second axis, the first search area including a second plurality of data points organized into an array spanning a third axis and a fourth axis, the second plurality of data points spaced to a third precision along the third axis and a fourth precision along the fourth axis, wherein the first axis is parallel to one of either the third axis or fourth axis and the second axis is parallel to the other of either the third axis or the fourth axis, and wherein the first precision is equal to the precision of the second plurality of data along said one of either the third axis or fourth axis and the second precision is equal to the precision of the second plurality of data along said other of either the third axis or fourth axis, the method comprising the steps of:
    determining a subsampling factor from the first plurality of data points;
    subsampling the first template to achieve a subsampled template having a third plurality of data points, wherein for each one data point of the third plurality of data points there are at least n corresponding data points among the first plurality of data points, wherein n equals the subsampling factor;
    subsampling the first search area to achieve a subsampled search area having a fourth plurality of data points, wherein for each one data point of the fourth plurality of data points there are at least n corresponding data points among the second plurality of data points;
    identifying all potential windows areas of the subsampled search area that are of the same dimension as the subsampled template, wherein each one of the potential window areas is an array of data points;
    correlating each one of the potential window areas to the subsampled template to achieve a corresponding correlation coefficient;
    for each corresponding correlation coefficient exceeding a specific value, identifying the corresponding window area within the subsampled search area as a selected window;
    for each one selected window of the subsampled search area, identifying a corresponding window in the first search area having at least n data points for each one data point of said one selected window; and
    for each one selected window, searching for the estimated template match within the corresponding window in the first search area.

22. The method of claim 21, further comprising the step of:
    identifying a first step size for the third axis and a second step size for the fourth axis; and
    in which the step of searching for a template match comprises the steps of:

using at least one of the first step size and the second step size to choose windows of the same size as the first template within the corresponding window of the first search area to correlate with the first template.

23. The method of claim 22, further comprising the step of:

correlating each said window chosen to the first template to derive a correlation coefficient, wherein each one of said chosen windows for which the derived correlation coefficient exceeds the specific value is identified as a candidate window;

searching in the vicinity of each candidate window of the first search area to identify a template match.

24. A method for locating an estimated template match between a first template of data and a window within a first search area of data, the first template being a two-dimensional array of data, the method comprising the steps of:

deriving the first search area of data from an original search area of data, the original search area being a two dimensional array of data, the first search area being a three dimensional search area of data comprising a plurality of two dimensional slices of data, in which one of said two dimensional slices of data is the original search area;

deriving a first step size, a second step size and a third step size from the first template;

selecting, using the third step size, a subset of slices of the first search area; and testing for a potential template match within each one slice of the selected subset of slices.

25. The method of claim 24, in which the step of testing comprises the step of:

within each one slice of the selected subset of slices, correlating the first template to a subset of windows within said one slice to search for a potential template match, wherein the subset of windows is chosen using the first step size and the second step size, wherein the potential template match is any window in the subset of windows which correlates to the first template by a correlation coefficient exceeding a specific value.

26. The method of claim 25, further comprising the step of:

for each potential template match projecting the potential template match onto neighboring slices and searching in the neighboring slices for additional potential template matches.

27. The method of claim 26, further comprising the step of:

for each one potential template match searching for the estimated template match in the vicinity of said one potential template match on the slice of said one potential template match.

28. An apparatus for estimating a location of a first template of data within a search area of data, the first template including a first plurality of data points, the search area including a second plurality of data points exceeding in number the first plurality of data points, the apparatus comprising:

a processor which pads the first template with additional data to enlarge the template into a padded template, wherein a first window area within the padded template is formed by the first template and includes the first plurality of data points;

a correlator which correlates the first template to window areas within the padded template along a first axis about the first window area to derive a first step size, and which correlates the first template to window areas within the padded template along a second axis about the first window area to derive a second step size;

means for deriving a third step size from the first template and the padded template; and wherein the first step size, second step size and third step size are used to select window areas to evaluate for estimating the location of the first template within the search area.

29. An apparatus for estimating a location of a first template of data within a search area of data, the first template including a first plurality of data points, the search area including a second plurality of data points exceeding in number the first plurality of data points, the apparatus comprising:

means for padding the first template with additional data points to enlarge the template into a padded template, wherein a first window area within the padded template is formed by the first template and includes the first plurality of data points;

means for correlating the first template to window areas within the padded template along a first axis about the first window area to derive a first step size;

means for correlating the first template to window areas within the padded template along a second axis about the first window area to derive a second step size; and means for deriving a third step size from the first template and the padded template;

wherein the first step size, second step size and third step size are used to select window areas to evaluate for estimating the location of the first template within the search area.

30. The apparatus of claim 29, in which the means for deriving comprises:

means for correlating the first template to window areas within the padded template along a third axis about the first window area to derive a third step size.

31. The apparatus of claim 30, in which the first axis and second axis are linear axes and the third axis is a rotational axis.

32. The apparatus of claim 30, in which the first axis, second axis and third axis are orthogonal spatial axes.

33. The apparatus of claim 30, in which the first axis and second axis are linear axes and the third axis corresponds to time.

34. The apparatus of claim 30, in which the first axis and second axis are linear axes and the third axis corresponds to frequency.

35. The apparatus of claim 30, in which the search area is a two dimensional search area, and further comprising:

means for deriving search area slices from the two dimensional search area to achieve a three dimensional search area, wherein the two dimensional search area is one slice of the three dimensional search area.

36. The apparatus of claim 35, further comprising:

means for selecting a subset of slices using the third step size;

means for correlating the first template to a selected set of windows into each one slice among the selected subset of slices, wherein the set of windows is selected using the first step size and the second step size.

37. The apparatus of claim 30, in which the search area is a two dimensional search area having a first resolution, and further comprising:

means for deriving a subsampled search area from the two dimensional search area by subsampling the two dimensional search area at a second resolution different from the first resolution using the third step size as a resolution subsampling factor;

means for deriving a subsampled template by subsampling the first template at the second resolution using the third step size as the resolution subsampling factor.

38. The apparatus of claim 37, further comprising:

means for correlating the subsampled template to windows of the subsampled search area to derive corresponding correlation coefficients;

means for identifying a candidate location in the subsampled search area based upon the derived correlation coefficients;

means for identifying a template match between the first template and a window match of the two dimensional search area by searching within an area of the two dimensional search area corresponding to the identified candidate location in the subsampled search area, wherein the first step size and second step size are used to select windows within the area of the two dimensional search area corresponding to the identified candidate location to be correlated to the first template.

39. The method of claim 1, in which the first step size, second step size and third step size are derived independently of the search area.

40. The apparatus of claim 29, in which the first step size, second step size and third step size are derived independently of the search area.

* * * * *